United States Patent
Sasakura et al.

[11] Patent Number: 6,151,493
[45] Date of Patent: Nov. 21, 2000

[54] DEVICE FOR PROHIBITING UNAUTHORIZED USE OF ELECTRONIC DEVICES

[75] Inventors: Toyoki Sasakura, Ashiya; Kenichi Miyamoto, Tokyo, both of Japan

[73] Assignee: Miyaken Co., Ltd., Tokyo, Japan

[21] Appl. No.: 09/000,764

[22] Filed: Dec. 30, 1997

[30] Foreign Application Priority Data

Sep. 4, 1997 [JP] Japan .................................. 9-239842

[51] Int. Cl.⁷ .............................. H04B 7/00; H04B 1/40; G08B 13/14; G08B 23/00; G08B 17/00

[52] U.S. Cl. .......................... 455/421; 455/421; 455/66; 455/67.1; 455/69; 340/568.6; 340/571; 340/686.6; 340/573.1

[58] Field of Search ................................ 455/69, 66, 410, 455/421, 411, 456, 565, 575, 11.1, 134; 248/825.69, 825.72; 340/539, 568.6, 573.1, 568, 571, 572, 573, 686.6, 686.1, 573.4

[56] References Cited

U.S. PATENT DOCUMENTS

| | | | |
|---|---|---|---|
| 4,593,273 | 6/1986 | Narcisse | 340/539 |
| 4,853,951 | 8/1989 | Bauer | 379/62 |
| 4,871,997 | 10/1989 | Adriaenssens | 340/539 |
| 5,461,365 | 10/1995 | Schlager et al. | 340/573 |
| 5,553,314 | 9/1996 | Grube et al. | 455/54.2 |
| 5,635,897 | 6/1997 | Kuo | 340/311.1 |
| 5,646,593 | 7/1997 | Hughes et al. | 340/573 |
| 5,748,084 | 5/1998 | Isikoff | 340/568 |
| 5,757,271 | 5/1998 | Andrews | 340/568 |
| 5,760,690 | 6/1998 | French | 340/571 |
| 5,796,338 | 8/1998 | Mardiossian | 340/568 |
| 5,809,414 | 9/1998 | Coverdale et al. | 455/421 |
| 5,857,144 | 1/1999 | Mangum et al. | 455/11.1 |
| 5,864,757 | 1/1999 | Parker | 455/418 |

FOREIGN PATENT DOCUMENTS

| | | |
|---|---|---|
| 5-95328 | 4/1993 | Japan . |
| 8-307936 | 11/1996 | Japan . |
| 9-64967 | 3/1997 | Japan . |

*Primary Examiner*—Daniel S. Hunter
*Assistant Examiner*—Meless Zewdu
*Attorney, Agent, or Firm*—Wenderoth, Lind & Ponack, L.L.P.

[57] ABSTRACT

A use prohibition system which can disable a cellular phone or any other device if it separates more than a predetermined distance from the user, and at the same time give a warning to the user. It includes an identification signal transmission unit and a use prohibition mode canceling unit attached or mounted to the cellphone. Each unit has a transmitter and a receiver. The receiver of the canceling unit receives an ID code signal from the transmission unit and produces, based on the ID signal received, a use prohibition canceling signal. The canceling unit returns a confirmation signal to the transmission unit. If the two units separate more than a predetermined distance from each other, the levels of the ID signal and the confirmation signal received by the respective units drop below a predetermined value. Thus, the canceling unit stops producing the canceling signal to disable the cellphone, while the transmission unit sounds an alarm.

10 Claims, 10 Drawing Sheets

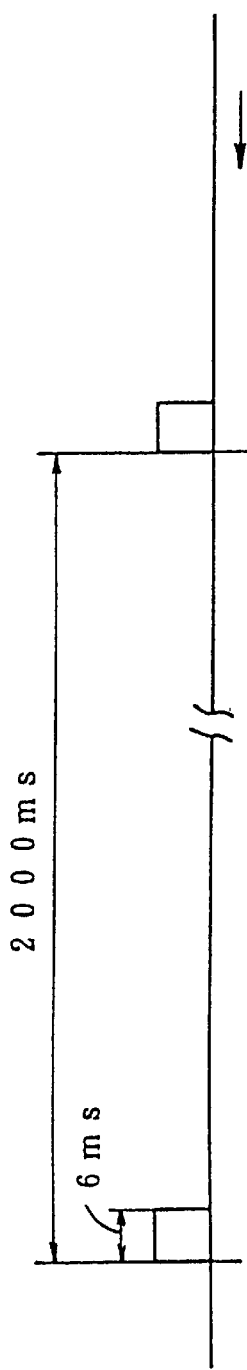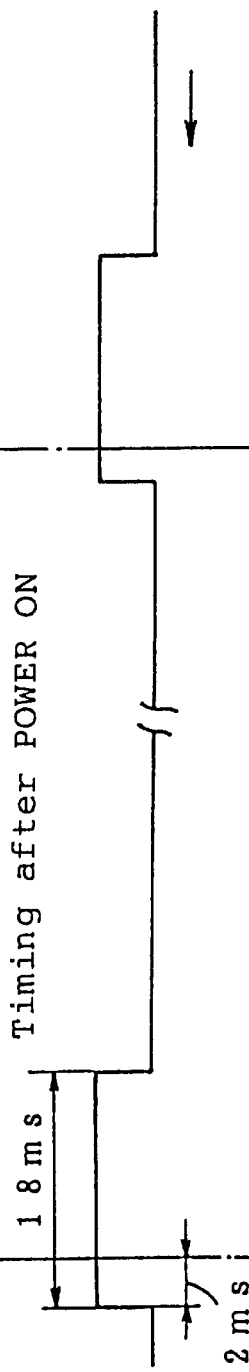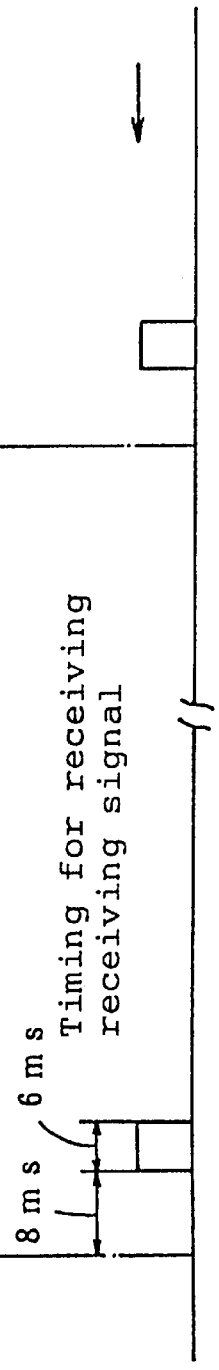

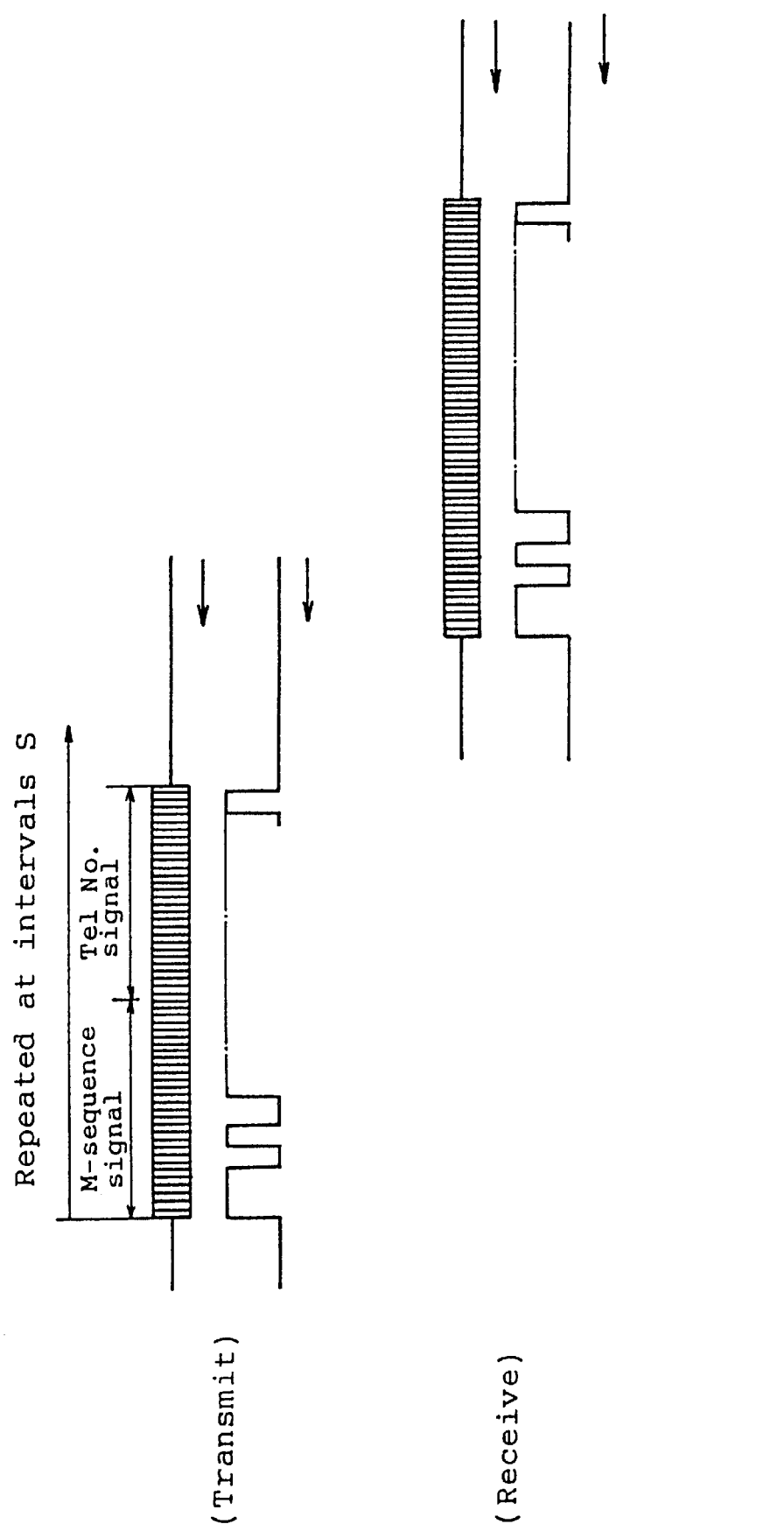

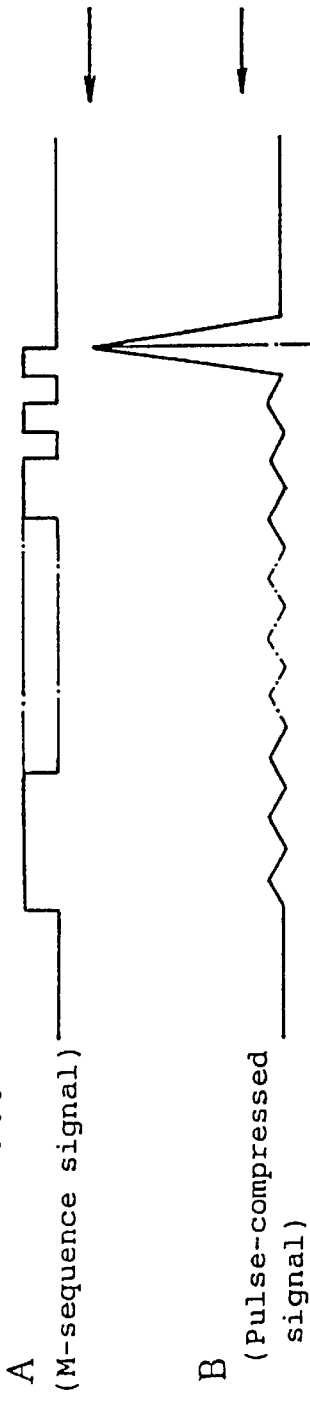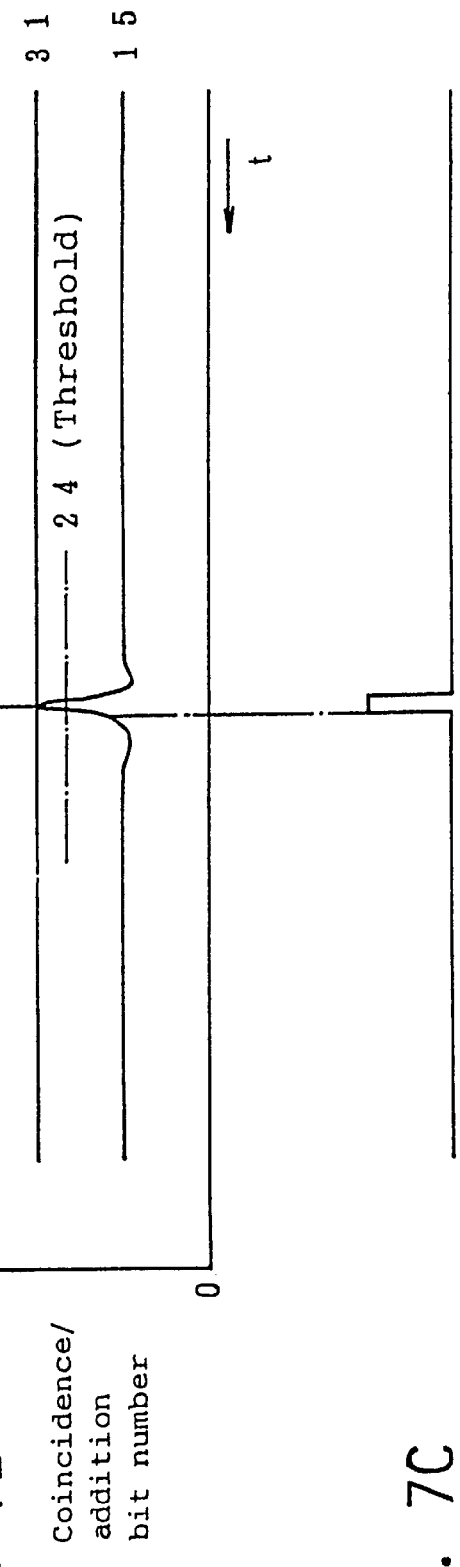
FIG. 7A
A (M-sequence signal)
B (Pulse-compressed signal)
FIG. 7B
Coincidence/addition bit number
FIG. 7C Waveform of signal received Waveform after threshold treatment Comfirmation signal

|← 3.1m s →|← 2.9m s →|
M-sequence code (31 bit)  Phone number code (29 bit)

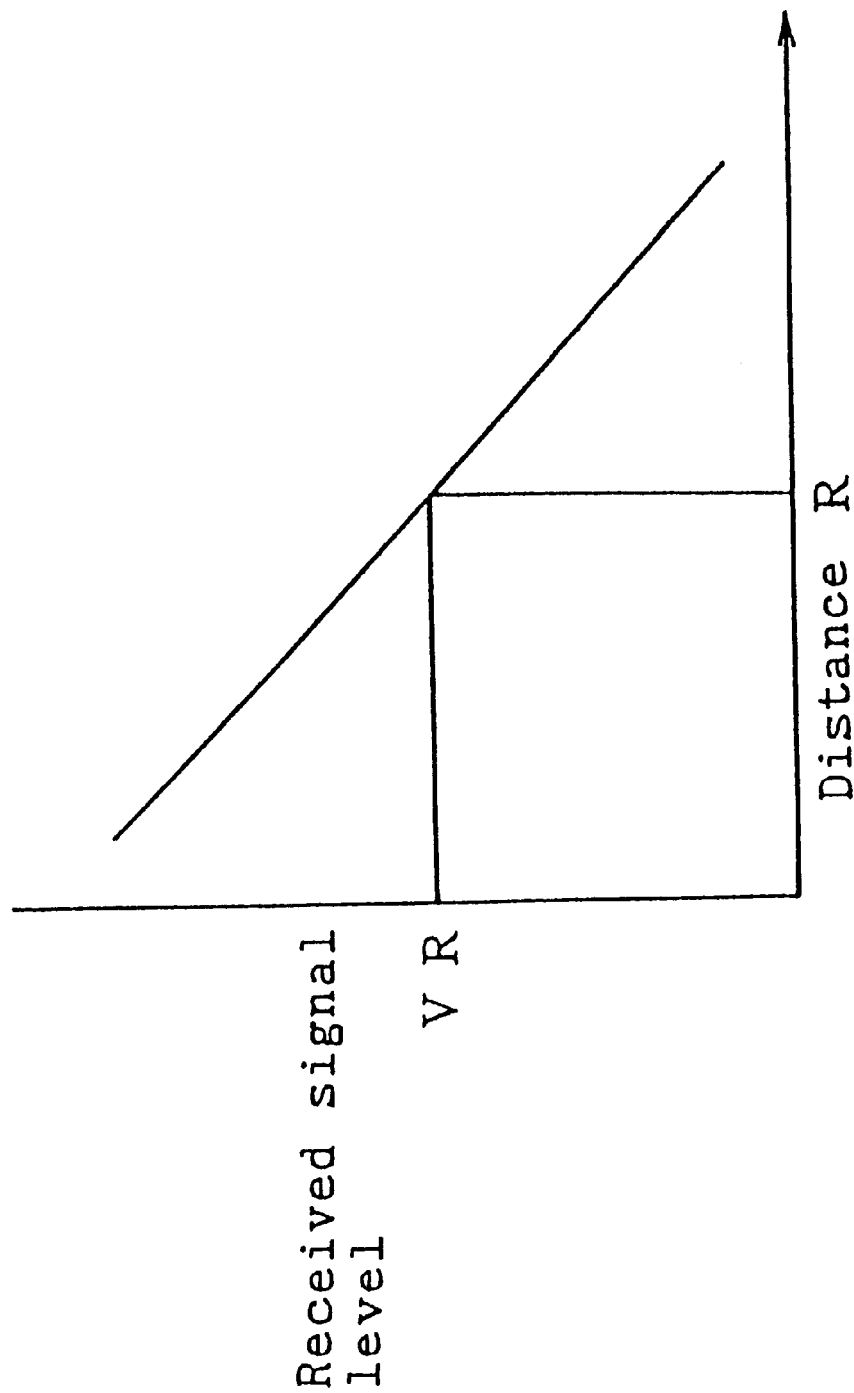

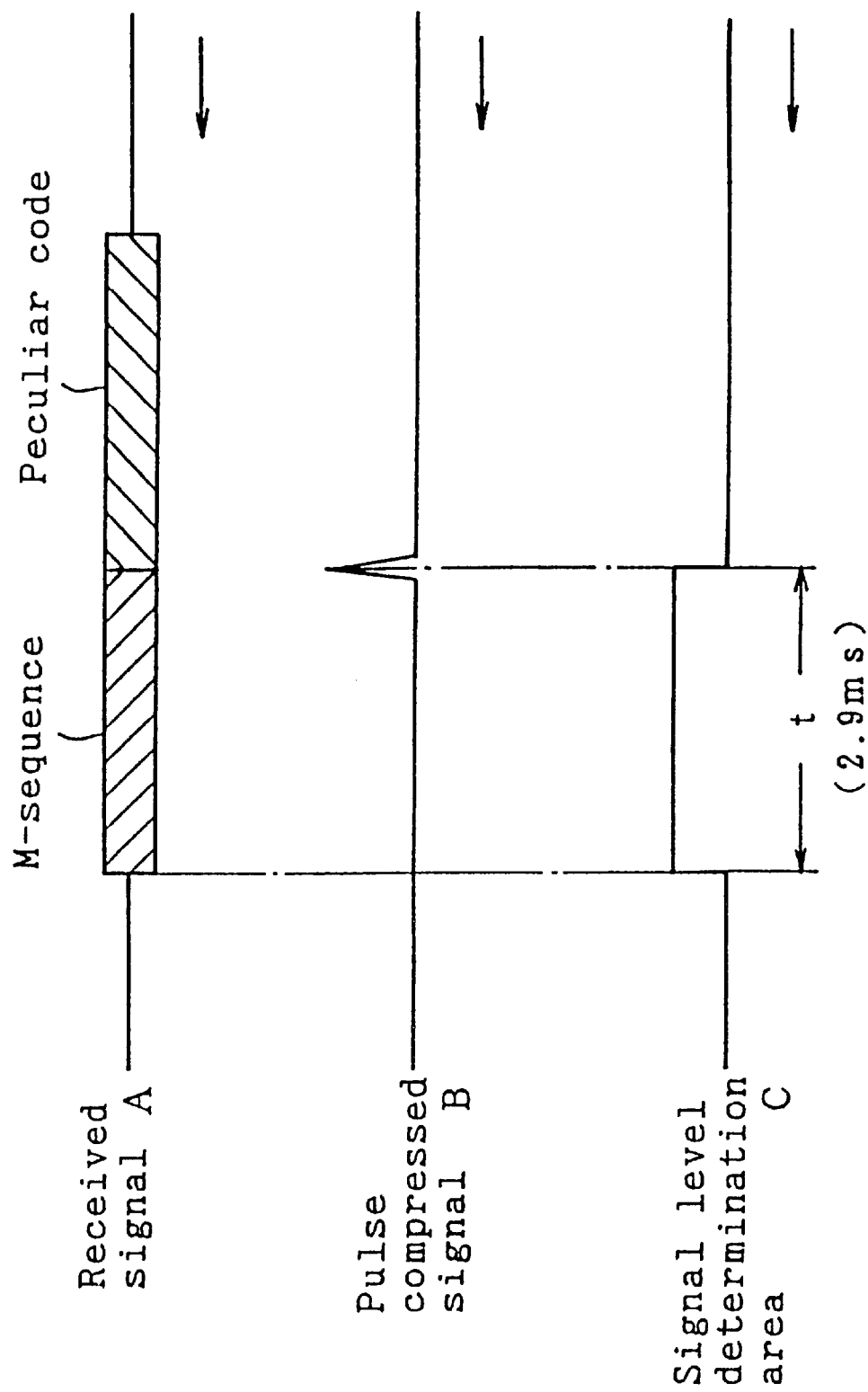

DEVICE FOR PROHIBITING UNAUTHORIZED USE OF ELECTRONIC DEVICES

BACKGROUND OF THE INVENTION

This invention relates to a device for preventing or prohibiting the use of cellular phones (or cellphones) or other devices by unauthorized individuals if they are left behind or stolen.

The number of cellphone users is increasing at a surprisingly rapid pace. Cellphones are now available in numerous different types and functions. The latest models are compact and lightweight and easy to use. Within a calling area, one can call anyone at any place through his cellphone even while he is walking, driving or in a train or a bus.

With the increase in number of cellphone users, the number of cellphones that are left behind or stolen is equally increasing. Anyone who steals or picks up someone else's cellphone may use it unlawfully. Many cellphones are thus equipped with means for prohibiting the use by such unauthorized individuals.

One such means is a system having a call prohibition mode and a means for deactivating the prohibition mode when a correct identification (ID) number is entered. Such a system is disclosed in unexamined Japanese patent publication 6-291835. This system has a personal identification number memory in which is stored a personal ID number. Only when the phone number and correct ID number are entered through input keys, is the call prohibition mode deactivated.

Another use prohibition means is disclosed in unexamined Japanese patent publication 6-326659. This means is built in a cellphone and has a receiver for receiving the phone number of the cellphone and a sub-address signal. If the receiver receives only the phone number when someone calls this cellphone, the call prohibition mode is kept deactivated, so that the call is put through. If the receiver receives both the phone number and the sub-address signal when someone, most typically the legitimate user of the cellphone, calls his own cellphone, which may have been stolen or left behind, the call prohibition mode is activated.

The former system, i.e. the ID-deactivated call prohibition system, is intended to prevent corporate employees from using corporate cellphones for private purposes. It is not intended to prohibit the use of cellphones by unauthorized individuals.

In order for a corporate employee to use a cellphone equipped with this system, he has to first connect the phone to an ID number registration device to deactivate the call prohibition mode. If the cellphone is stolen or left behind with the call prohibition mode deactivated, there is no way to prevent unauthorized use of this cellphone.

In the latter system, if the receiver receives both the phone number and the sub-address signal, the call prohibition mode is activated. The problem with this arrangement is that the call prohibition mode is kept deactivated until the receiver receives both the phone number and sub-address number. If the legitimate user notices, belatedly, the fact that his cellphone has been stolen or left behind, anyone who has the phone can use the phone freely until the call prohibition mode is activated by the user.

To solve these problems, the inventors of this application proposed in a prior patent application a call prohibition system comprising a receiver mounted in the cellphone, and a card-shaped transmitter for transmitting a radio signal. The card transmitter can be put in the user's breast pocket. If the transmitter (user) moves more than a predetermined distance away from the receiver (cellphone), a level of the signal received by the receiver from the transmitter drops below a predetermined value, and the cellphone is automatically disabled.

In this arrangement, if the user of this cellphone unknowingly leaves his phone behind or has it stolen, the phone is disabled automatically, i.e. without the need for the user to do anything.

This system has no alarm means for notifying the user of the fact that his phone has been left behind or stolen. Thus, it is possible that the user may not notice that he has lost his phone for a long time. This alarm is important because, some people who acquire the phone might decipher the use prohibition mode canceling signal from the card transmitter, or deactivate the use prohibition mode of the cellphone to use the phone without permission of the owner.

An object of this invention is to provide a use prohibition system which can disable a cellular phone or any other object if it separates more than a predetermined distance from the user, and at the same time give a warning to the user.

SUMMARY OF THE INVENTION

According to this invention, there is provided a use prohibition system for prohibiting the use of a device, the system comprising: an identification code transmission unit including a transmitter and a receiver for transmitting an identification code signal of a predetermined magnitude from the transmitter; and a use prohibition canceling unit attached to the device and including a receiver and a transmitter for transmitting, based on the identification code signal received by the receiver of the canceling unit, a use prohibition canceling signal to the device, and transmitting a confirmation code signal that is identical to the identification code signal from the transmitter of the canceling unit. The use prohibition canceling unit having means for stopping the transmission of the use prohibition canceling signal and the identification code transmission unit producing an alarm signal if the distance between the two units becomes greater than a predetermined value, so that the level of the signal received by each of the two units from the other unit becomes lower than a predetermined value.

The use prohibition system according to this invention comprises an ID transmission unit and a use prohibition mode canceling unit. The use prohibition canceling unit is attached to, built in, or otherwise physically coupled to the device which needs to be disabled if necessary.

The ID transmission unit is preferably a thin, light member in the shape of a card, and is always kept by the user in his breast pocket.

During use of the cellphone, the canceling unit receives an ID signal transmitted from the transmission unit and transmits a use prohibition canceling signal to the cellphone to deactivate the prohibition mode.

An ID code signal of a predetermined level is transmitted from the transmission unit at predetermined intervals. As long as the cellphone and the canceling unit are within a predetermined distance from the user, the level of the ID signal received by the receiver of the canceling unit is higher than a predetermined level, so that the canceling unit keeps transmitting the use prohibition mode canceling signal to the cellphone, keeping the cellphone activated.

The level of the ID signal received by the receiver of the canceling unit is inversely proportional to the square of the distance between the canceling unit and the transmission unit. Thus, if the signal level drops below a predetermined value, the canceling unit judges that the cellphone and canceling unit have separated a predetermined distance from the user, and stops producing the use prohibition canceling signal.

If the canceling unit separates more than a predetermined distance from the transmission unit, the level of the confirmation signal from the canceling unit also drops when it is received by the receiver of the transmission unit. Thus, the transmission unit detects this fact and produces a warning, notifying the user that the cellphone has been left behind or stolen. The user can thus take any necessary measures.

Other features and objects of the present invention will become apparent from the following description made with reference to the accompanying drawings, in which:

BRIEF DESCRIPTION OF THE DRAWINGS

FIGS. 5A–5C are views showing the transmission timing of an ID signal;

FIG. 6 is a view showing construction of the ID signal;

FIGS. 7A–7C are views of a pulse-compressed signal and the pulse compression step;

FIGS. 9A and 9B are views showing the level of the signal received and a signal level judging section.

DETAILED DESCRIPTION OF THE PREFERRED EMBODIMENT

An embodiment of this invention is now described.

Figure 1:
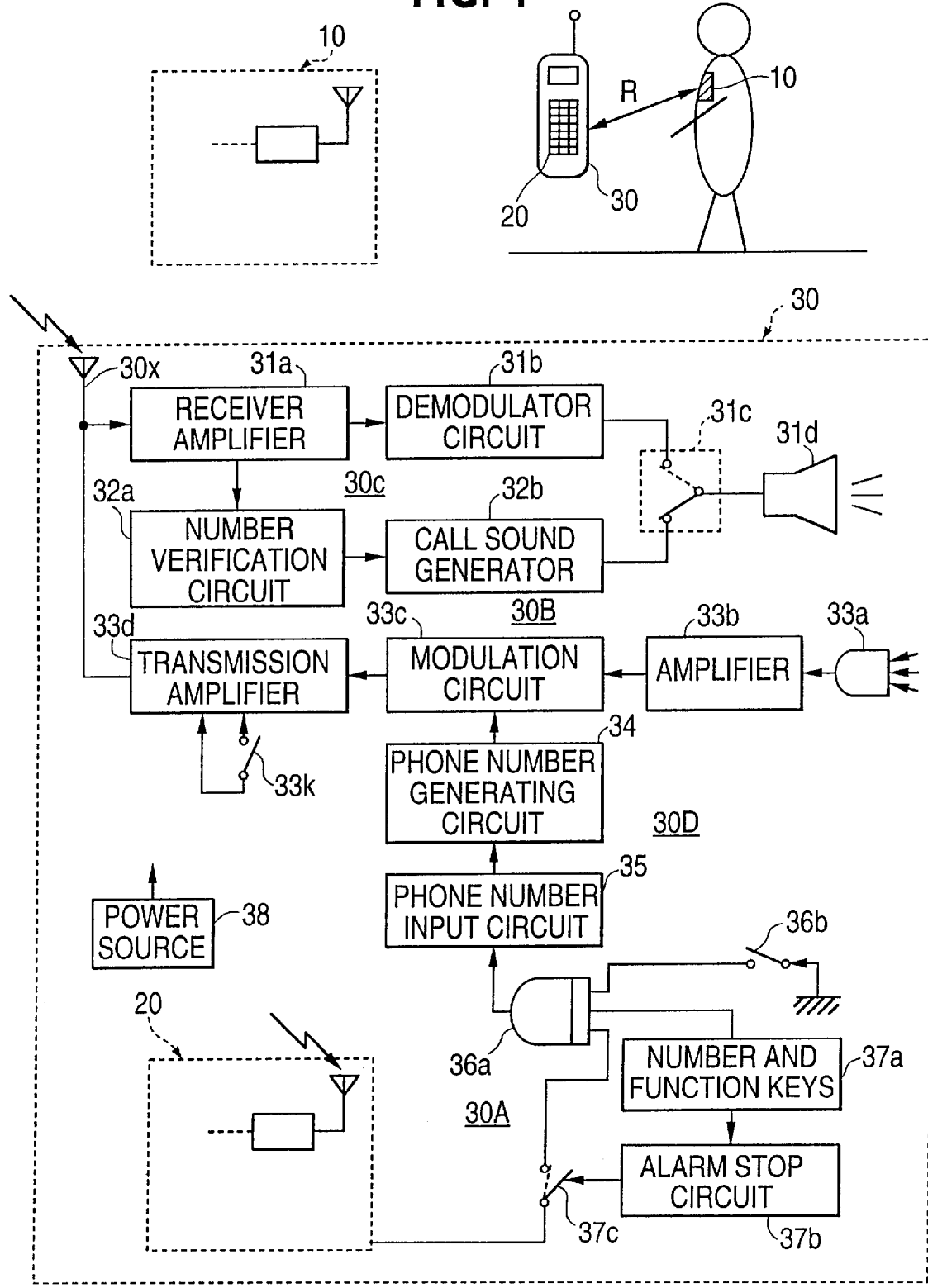
FIG. 1 is a schematic view of a use prohibition system for a cellular phone.

FIG. 1 is a block diagram of a call prohibition device used for a cellular phone. The call prohibition device comprises a card-shaped identification signal transmission unit 10, and a call prohibition mode canceling unit 20 mounted in a cellphone 30 (though it may be simply attached to the cellphone). The ID signal transmission unit 10 is a separate member from the cellphone 30.

The cellphone 30 has nothing different from conventional cellphones except that it further includes a call prohibition circuit 30A. The owner of the cellphone 30 keeps the transmission unit 10 around him e.g. in his breast pocket, so that the transmission unit 10 is always within a predetermined distance from the cellphone 30. The transmission unit 10 does not have to be card-shaped but may be key-shaped or any other convenient-to-carry shape.

The cellphone itself is conventional, comprising a transmitter 30B, a receiver 30C, a phone number input 30D, and a power source 38. The transmitter 30B comprises a microphone 30a for converting speech sounds into voice signals, an amplifier 33b for amplifying the voice signals, a modulation circuit 33c for modulating the amplified voice signals with carrier wave signals, and a transmission amplifier 33d for amplifying the modulated signals. The thus modulated and amplified signals are transmitted to a telephone station by a transmit-receive antenna 30x. By operating a talk switch 33k of the transmission amplifier 33d, a talk mode is set. The receiver 30c includes a receiver amplifier 31a for amplifying an incoming call signal, a number verification circuit 32a for verifying the number of the calling party, and a call sound generator 32b connected to a speaker 31d through a hook switch 31c for producing call sounds from the speaker 31d. To answer the phone, i.e. to start the speech mode, the user changes over the hook switch 31c. Now the voice signal received is amplified by the amplifier 31a, demodulated by a demodulator circuit 31b, transmitted to the speaker 31d through the hook switch 31c, and produced from the speaker 31d as speech sounds.

In the phone number input 30D, a circuit is connected such that the input signal of a key operation invalidating switch 36b, and signals from number and function keys 37a and a switch 37c are entered into an AND gate 36a of the call prohibition circuit 30A. If the switch 37c is operated by the output of an alarm stop circuit 37b based on an ID number entered through the number and function keys 37a, and a phone number input mode is set by signals from the switches 36b and 37c, the signal from switch 37c being a call prohibition canceling signal from the canceling unit 20, then the phone number entered through the number and function keys 37a is sent through the gate 36a to a phone number input circuit 35, a phone number generating circuit 34, a modulation circuit 33c, a transmission amplifier 33d and is transmitted by the transmit-receive antenna 30x.

The power source 38 for supplying power to the respective circuits is controlled by a power switch (not shown). The canceling unit 20 may be powered by the power Source 38 or by another separate power source. In the former case, the unit 20 has to be directly connected to the source 38 so as to be kept activated even while the power switch is off, for reasons to be explained below.

Figure 2:
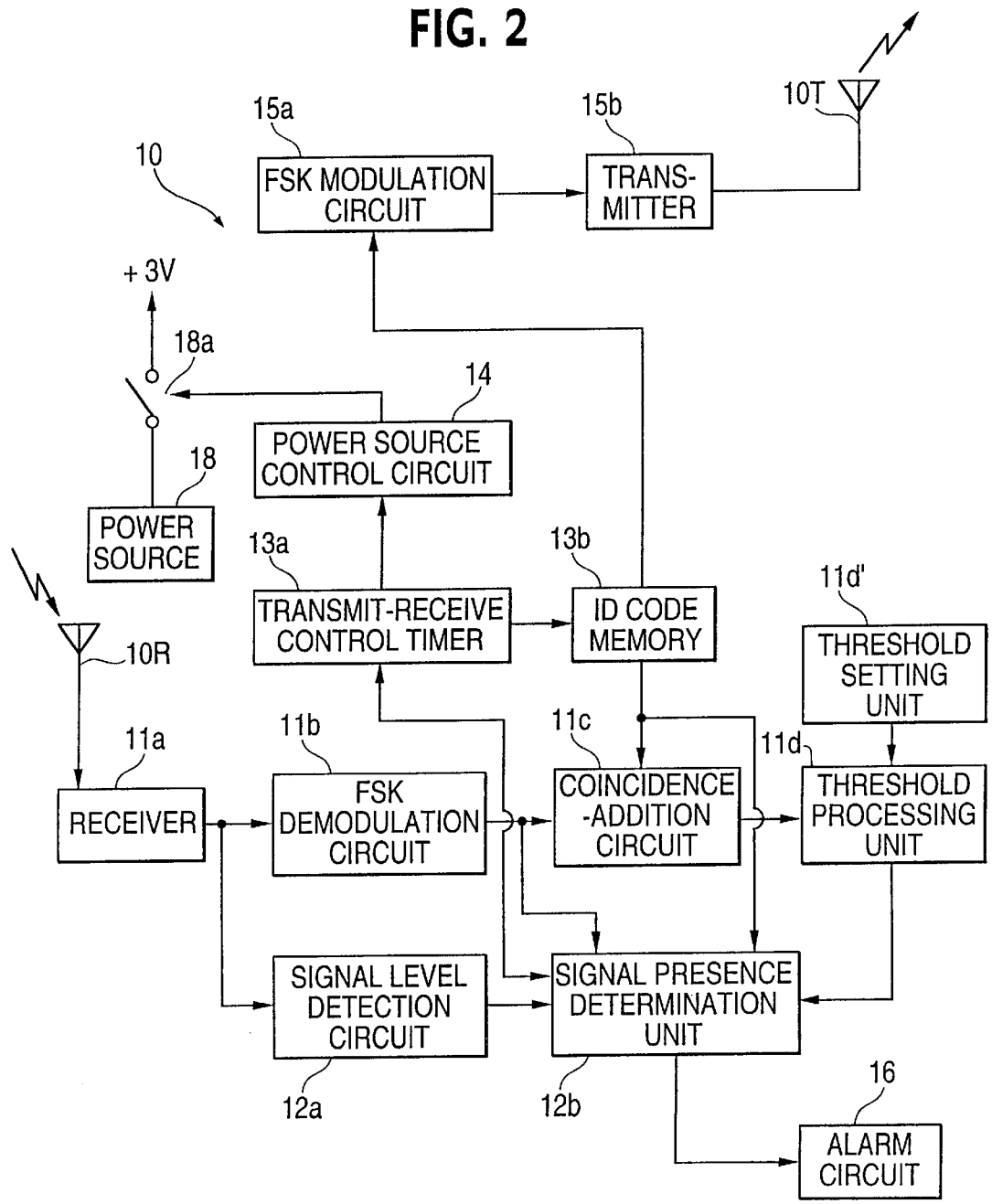
FIG. 2 is a block diagram of an identification signal transmission unit.

FIG. 2 shows the transmission unit 10. It comprises a transmitter 15b for transmitting an identification signal including a predetermined code signal from a transmission antenna 10T, and a receiver 11a for receiving through a receiver antenna 10R a confirmation signal returned from the transmitter of the canceling unit 20, which is to be described later.

The transmitter section for transmitting the identification signal transmits the identification signal, which is set in an identification code memory 13b, in response to a command from a transmit-receive control timer 13a, via the transmitter 15b after FSK-modulating the identification signal with carrier waves in an FSK modulation circuit 15a.

A power source control circuit 14 closes a switch 18a of a power source 18 by transmitting a signal to supply power to the respective parts of the unit 10.

The receiver section for receiving the above-described confirmation signal includes the following elements, which are all connected downstream of the receiver 11a. First, the confirmation signal received (250 MHz) is FSK-demodulated by an FSK demodulation circuit 11b and transmitted to a coincidence-addition circuit 11c. The circuit 11c reads the ID signal stored in the ID code memory 13b and determines whether the confirmation signal coincides with the ID signal by adding coincident points for each bit of the ID signal.

The thus processed output signal (pulse-compressed signal, which will be described later) is transmitted to a threshold processing unit 11d, which compares the output signal with a threshold set in a threshold setting unit 11d' and transmits a timing signal to a signal presence determination unit 12b if the output signal is above the threshold.

The confirmation signal received by the receiver 11a is also transmitted to a signal level detection circuit 12a. The signal indicative of the signal level detected by this circuit is transmitted to the signal, presence determination unit 12b, which is also inputted with the confirmation signal from the FSK demodulation circuit 11b and the ID code signal from the ID code memory 13b.

The signal presence determination unit 12b judges whether the confirmation signal coincides with the ID code signal, and judges whether the signal level of the confirmation signal received within time t after the timing signal was received from the threshold processing unit 11d is above a predetermined value. If both judgments are positive, the unit 12b outputs a negative signal. If the latter judgment is negative, even though the former judgment is yes, the unit 12b transmits an alarm signal to an alarm circuit 16.

Figure 3:
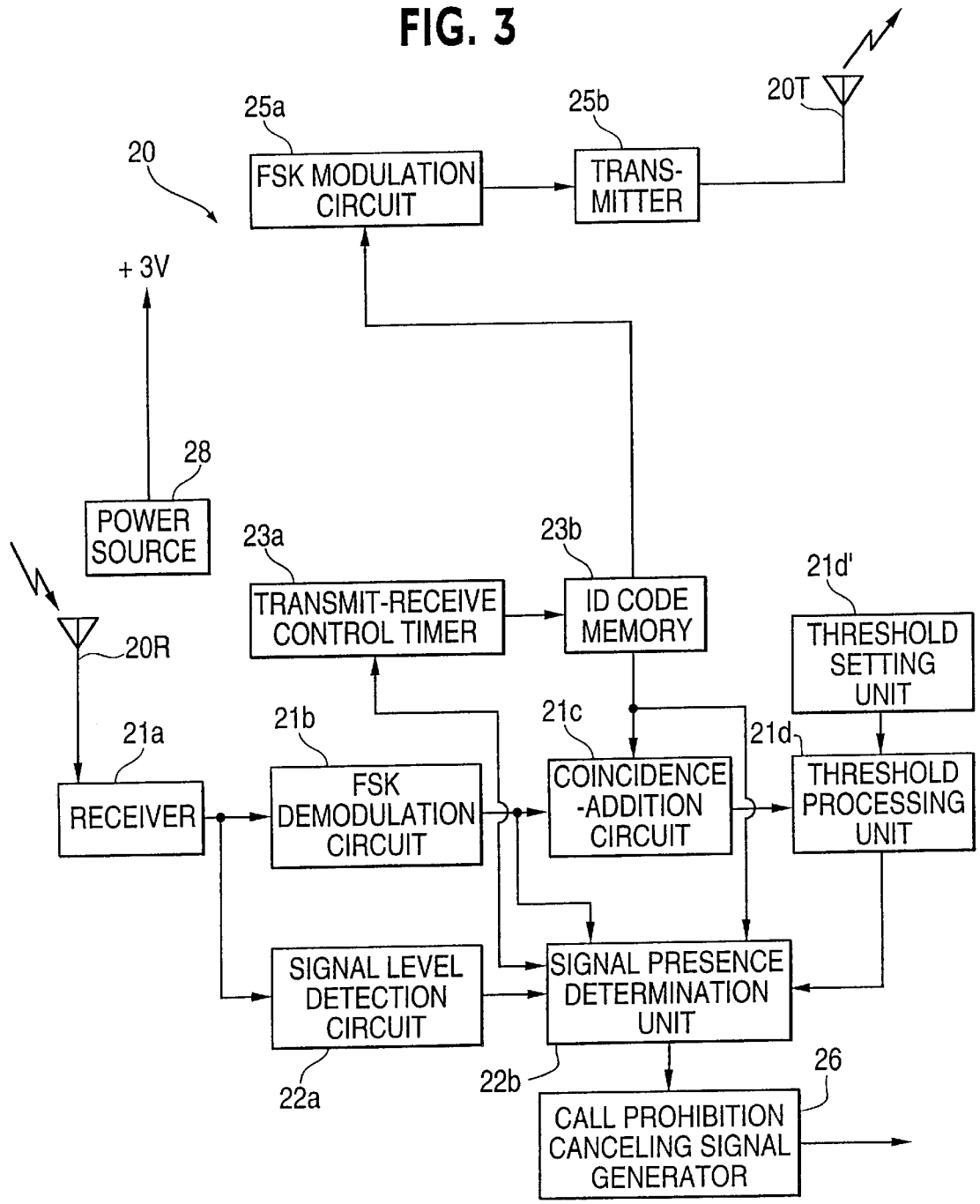
FIG. 3 is a block diagram of a use prohibition mode canceling unit.

FIG. 3 shows the prohibition mode canceling unit 20. As shown, it is substantially the same structure as the transmission unit 10 but differs in the following points.

Based on the ID signal from the transmission unit 10, a signal presence determination unit 22b determines the presence of a signal. As with the counterpart in the transmission unit 10, the signal presence determination unit 22b outputs no signal as long as it is receiving the ID signal. It differs in that while there is no output, the call prohibition canceling signal generating unit 26 keeps producing a call prohibition canceling signal, and if no ID signal is received, the signal presence determination unit 22b produces an output signal to stop the transmission of the canceling signal from the signal generator 26.

A transmit-receive control timer 23a has no control or influence on the power supply of the power source 28. that is, power is always supplied to the necessary parts so that the power supply is not interrupted by the power source switch irrespective of whether the power is supplied from the power source of the cellphone or from a separate source.

This is necessary because, as will be described in detail later, in order for the canceling unit 20 to be able to always receive the ID signal from the transmission unit 10 and return, upon confirmation of reception of the ID signal, the confirmation signal at predetermined intervals in response to the command from the transmit-receive control timer 23a, the canceling unit 20 has to be kept turned on.

Otherwise, the canceling unit 20 is basically no different from the transmission unit 10 of FIG. 2. Each 20-odd number in FIG. 3 indicates a part corresponding to a part of FIG. 2 designated by a 10-odd number with the same number of units. No further description is made on these parts.

In the above embodiment, a signal containing a predetermined code signal is used as the ID signal. But as shown in FIG. 6, the ID signal may be one comprising an M-sequence (maximum length null sequence) signal and a code signal particular to the cellphone number (hereinafter called phone number). The addition of M-sequence signal in the ID signal makes it possible to confirm that the ID signal received originates from the user's own cellphone.

The ID signal, made up of the M-sequence signal and the phone number signal, is transmitted, not continuously, but intermittently at intervals S (e.g. 2000 ms) to save electric power and, thus, to prolong the interval between recharges of the battery.

The M-sequence signal may be a C/A code, P code or linear FM signal. The phone number as the code signal may be any other ID number or signal indicative of other information about the owner or person in charge in the case of devices other than cellphones.

The M-sequence signal is a kind of binary pseudo-irregular signal consisting of 1s and 0s and having a length of 2 to the n-th power minus 1 ($2^n-1$). For example, if n=5, the signal is a 31-bit signal. The M-sequence signal is transmitted to the coincidence-addition circuit 11c and is pulse-compressed to $\frac{1}{31}$ as shown in FIG. 7B.

A different phone number code has to be allocated to every one of the cellphones sold. This will, however, pose no problem because $2^m$ different m-bit codes are available. For example, if m=30, there are about a billion different 30-bit codes. In the embodiment, the code signal represents the phone number but may represent any other number or code peculiar to the particular phone. The M-sequence signal and the particular code signal are stored in the ID code memory as the ID signal to prevent unauthorized use of the phone if it is stolen or left behind.

Figure 4:
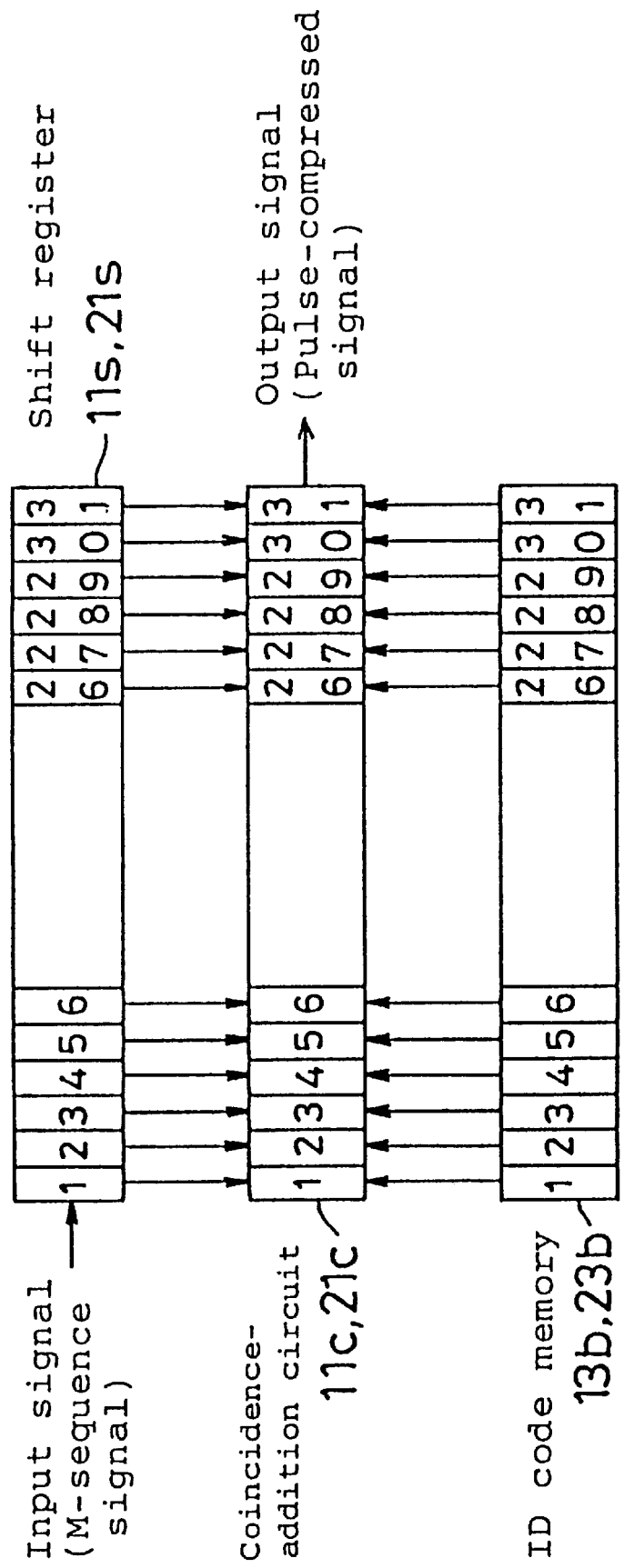
FIG. 4 is a schematic view of a coincidence-addition circuit.

FIG. 4 illustrates in detail how the ID signal is transmitted from the transmission unit 10, received by the canceling unit 20, how the canceling unit 20 returns the same signal as a confirmation signal to the transmission unit 10 after a predetermined time has passed, and how the confirmation signal received by the transmission unit 10 is pulse-compressed in the coincidence-addition circuit 11c. The confirmation signal received is demodulated by the FSK demodulator circuit 11b, and the front M-sequence signal in the confirmation signal is temporarily stored in a shift register 11s, which is not shown in FIG. 3.

The M-sequence signal stored in the shift register 11s is transmitted to the coincidence-addition circuit 11c, where an M-sequence signal in the memory data stored in the ID code memory 13b is read out and compared bit by bit with the M-sequence signal transmitted from the circuit 11c, and the number of coincident bits is added.

The signal processed in the coincidence-addition circuit 11c is pulse-compressed and output. The shift register of this embodiment has a memory capacity of 31 bits, while the ID code memory 13b has a 60-bit memory capacity (31 bits for the M-sequence signal and 29 bits for the peculiar code signal). Thus, the above two M-sequence signals are processed by calling only their respective data portions.

Now in operation, we will describe the operation of the transmission unit 10 separately from that of the canceling unit 20. First, description is made of how the ID signal is transmitted from the transmission unit 10. When the power switch (not shown) is turned on, the transmit-receive control timer 13a is set, and the switch 18a is closed by the source control circuit 14. Electric power is thus supplied from the power source unit 18 to necessary parts of the unit 10.

As shown in the time charts FIGS. 5A and 5B, 2 ms after the activation of the power source, by command of the control timer 13a, the ID signal in the ID code memory 13b is read out, modulated by the FSK modulator circuit 15a, and transmitted from the transmitter 15b through the transmission antenna 10T.

The ID signal is transmitted as mentioned above, by FSK modulating the 31-bit M-sequence signal and the 29-bit code that represents the cellphone number.

The ID signal from the transmission unit 10 is received by the canceling unit 20. If the level of the ID signal received is higher than a predetermined level, the canceling unit 20 recognizes its identity and returns the ID signal to the unit 10 as a confirmation signal. The timing of signal exchange is shown in FIGS. 5A–5C. The transmission unit 10 is kept on for 18 ms=2 ms for start-up+6 ms for transmission+2 ms for time-lag+6 ms for signal return+2 ms time-lag.

The control timer 13a activates the power source intermittently at predetermined timing e.g. 2000 ms, to transmit the ID signal intermittently at the same intervals. The ID signal transmitted from the transmission unit 10 may be received by its own receiver 11a. But even if this happens, the receiver 11a will ignore this signal because the receiver 11a can tell this signal from the confirmation signal from the unit 20. Thus, this signal cannot activate the alarm circuit 16.

The canceling unit 20 returns the confirmation signal at predetermined timing. The confirmation signal is received by the receiver 11a, and as described above with reference to FIG. 4, demodulated in the FSK demodulator circuit 11b and pulse-compressed in the coincidence-addition circuit 11c. In the pulse compression step, the M-sequence signal indicated by the letter A in FIG. 7A is pulse-compressed. As indicated by the letter B, the bit-by-bit data of the signal that is processed for coincidence and addition partially coincide with the corresponding bit-by-bit data of the M-sequence signal in the ID code memory before or even after the pulse string of the M-sequence signal has been entirely written in the shift register 11s. Thus, the pulse-compressed signal's value is always changing.

But when data that coincide with the M-sequence signal stored in the ID code memory 13b are written in the shift register 11s, the M-sequence signals can be deemed to coincide with each other if they meet each other for all of 31 bits in the shift register 13S so that the pulse-compressed signal is 31. But these signals can be deemed to coincide with each other if the coincidence takes place for at least 24 bits.

The threshold processing unit 11d determines whether or not the pulse-compressed signal level is higher than the threshold (e.g. 24) set by the threshold setting unit 11d' (see FIG. 7B). If it is higher, the threshold processing unit lid transmits a timing signal shown in FIG. 7C to the signal presence determination unit 12b.

Figure 8A:
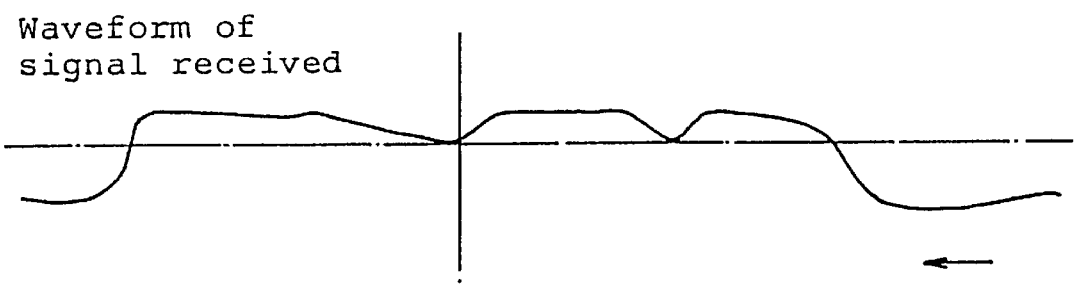
FIGS. 8A–8C are views showing the relationship between the waveform of a signal received and a confirmation signal.
Figure 8B:
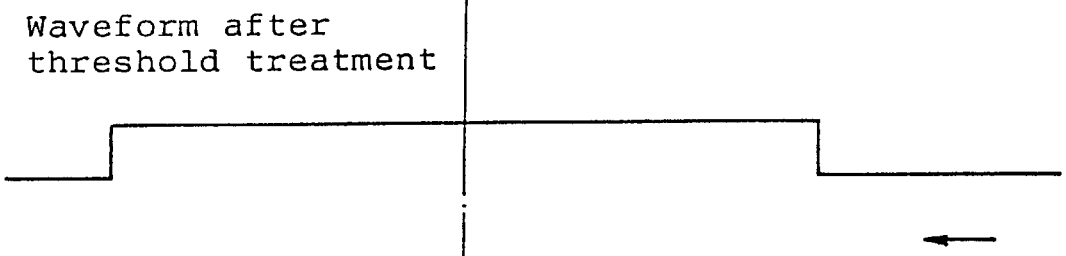
Figure 8C:
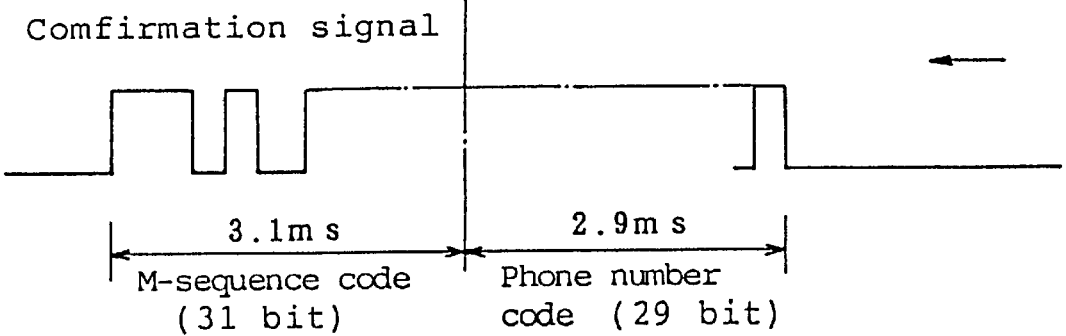

As described above, the level of the signal received by the receiver 11a is detected by the signal level detection circuit 12a. The signal presence determination unit 12b determines whether or not the signal level is higher than a predetermined value. Specifically, the unit 12b determines whether or not the level of the signal received (which has a waveform as shown in FIG. 8A) is higher than a voltage threshold.

As shown in FIG. 9A, the level of the signal received by the receiver 11a is inversely proportional to the square of the distance R between the transmission unit 10 and the canceling unit 20. (The values R and VR in FIG. 9A are the actual distance and signal level in terms of logarithm.) Thus, it is possible to determine whether or not the distance between the units 10 and 20 is greater than a predetermined value (e.g. 1 meter) by setting the voltage threshold at a value corresponding to the predetermined distance.

Instead of the above method, the received signal waveform may be A/D-converted and the voltage level of the, thus, A/D-converted signal may be compared with a threshold.

The signal level determination is carried out only during a given interval t (2.9 ms in the example shown) corresponding to the particular code signal received after the threshold processing unit 11d has processed the M-sequence signal and transmitted the timing signal so as not to pick up any noise or signal from other phones. By limiting to the predetermined interval specified by the timing signal, the signal level can be determined with accuracy.

Besides determining the signal level, the signal presence determination unit 12b judges if the particular code which has been received after the timing signal has been inputted and FSK-demodulated coincides with the particular code stored in the ID code memory 13b. Specifically, as long as the signal presence determination unit 12b is receiving the timing signal, and the particular code of a predetermined level after a predetermined time, and the particular code received is coincident with its own particular code, the signal presence determination unit 12b judges that the transmission unit 10 is within a predetermined distance from the canceling unit 20. In this case, the unit 12b produces no signal.

But even if the timing signal is entered and the peculiar code received is coincident with the code stored in the unit 12b, its level may be lower than the threshold. This means that the canceling unit 20 has separated more than the predetermined distance from the transmission unit 10. Thus, in this case, the unit 12b activates the alarm circuit 16 by outputting a signal.

The alarm produced by the alarm circuit 16 may be in the form of a human voice such as "Don't leave me". Such an alarm notifies the user that his cellphone, in which is mounted the canceling unit 20, has been left behind, stolen or otherwise separated from the transmission unit 10, which may be in a user's pocket.

The alarm produced by the alarm circuit 16 may also be a beep sound, a beep plus a "Don't leave me" message displayed on a screen, or any other conceivable means. If the signal presence determination unit 12b receives a signal other than a confirmation signal of its own ID code, some or all of the abovementioned three conditions are not met, so that the unit 12b produces no output. Thus, such a signal has no influence on the signal receiving function of the transmission unit.

The operation of the canceling unit 20 is now described. As mentioned above, the unit 20 is always on irrespective of whether the power switch of the phone 30 is on or off. Thus, whenever the ID code is transmitted from the transmission unit 10, it is received instantly by the receiver 21a of the canceling unit 20.

The ID signal received is demodulated by the FSK demodulator circuit 21b, and transmitted to the coincidence-addition circuit 21c. A timing signal based on the M-sequence signal is transmitted from the threshold processing unit 21d to the signal presence determination unit 22b. The signal level detection circuit 22a detects the level of the signal received, and the signal presence determination unit 22b determines whether or not the signal level is above a threshold for a period t during which the timing signal is being received by the unit 22b. These are the same features as with the transmission unit 10.

Also, the canceling unit 20 operates in the same way as the transmission unit 10 in that the signal presence determination unit 22b determines whether or not the signal received coincides with its own particular code stored in the ID code memory 23b. But the signal presence determination unit 22b of the canceling unit 20 produces no signal as long as the following three conditions are met, i.e. if the timing signal is received, the signal level is above the predetermined level in two judgments and the signal coincides with the particular code.

No output from the unit 22b means that the cellphone 30 is near the transmission unit 10, i.e. the user has his phone 30 on his person. Thus, without such an output, the use prohibition canceling signal generator 26 keeps producing a use prohibition canceling signal, keeping the phone 30 in its usable mode.

After a predetermined time (2 ms in the embodiment) from the reception of the ID signal, the signal presence determination unit 22b produces a signal to set the transmit-receive timer 23a, reads a signal exactly identical to the ID signal received from the ID code memory 23b, and transmits the signal thus read through the FSK modulator circuit 25a and the transmitter 25b. As mentioned above, this signal is received by the transmission unit 10 as the confirmation signal.

If the cellphone 30, together with the canceling unit 20, separates a predetermined distance from the transmission unit because the cellphone is left behind or stolen, the signal level detected by the signal level detector drops below the threshold. The signal presence determination unit 22b thus determines that no ID signal is received, and outputs a signal to stop producing a use prohibition canceling signal from the canceling signal generator 26. The cellphone 30 is thus disabled.

At the same time, an alarm goes off, notifying the user of the fact that his cellphone is out of his reach.

Besides cellphones, the use prohibition system of the invention is applicable to practically anything including word processors, personal computers, gaming machines, automobiles, and safes. In the present embodiment, signal carriers are electric waves but may be ultrasonic or light.

With this arrangement, the moment a cellular phone or anything equipped with the use prohibition system is left behind or stolen, the cellphone is disabled, and simultaneously, its user is notified of this fact. Thus, he can take any necessary measures quickly.

What is claimed is:

1. A device for prohibiting unauthorized use of an electronic device, the device comprising:
   an identification code transmission unit comprising:
      a first transmitter for transmitting an identification code signal at a constant level;
      a first receiver for receiving a confirmation signal;
      an alarm mechanism being activated when the confirmation signal received by said first receiver is below a predetermined value;
   a use prohibition canceling unit comprising:
      a second transmitter for transmitting the confirmation signal at a constant level;
      a second receiver for receiving the identification code signal; and
      said use prohibition canceling unit maintaining the electronic device in an operational state while the identification code signal received by said second receiver is at or above the predetermined value, and when the identification code signal is below the predetermined value, said use prohibition canceling unit at least partially disabling the electronic device.

2. The device as claimed in claim 1, wherein the electronic device comprises a cellular phone.

3. The device as claimed in claim 2, wherein said identification code transmission unit further comprises a first transmit-receive control timer for transmitting the identification code signal and receiving the confirmation code signal as intermittent signals and said use prohibition canceling unit further comprises a second transmit-receive control timer for transmitting the confirmation code signal and receiving the identification code signal as intermittent signals.

4. The device as claimed in claim 2, wherein at least one of the identification code signal and the confirmation signal comprises a binarized pseudo-irregular signal and a particular code signal.

5. The device as claimed in claim 1, wherein at least one of the identification code signal and the confirmation signal comprises a binarized pseudo-irregular signal and a particular code signal.

6. The device as claimed in claim 5, wherein said identification code transmission unit further comprises a first transmit-receive control timer for transmitting the identification code signal and receiving the confirmation code signal as intermittent signals and said use prohibition canceling unit farther comprises a second transmit-receive control timer for transmitting the confirmation code signal and receiving the identification code signal as intermittent signals.

7. The device as claimed in claim 5, wherein said identification code transmission unit and said use prohibition canceling unit each further comprise:
   a timing signal generator for producing a timing signal based on the binarized pseudo-irregular signal; and
   a signal presence determination unit for receiving the timing signal, judging within a predetermined time if the particular signal coincides with its own code, determining whether the particular signal is higher than the predetermined value, and determining whether said identification code transmission unit and said use prohibition canceling unit are more than a predetermined distance from each other.

8. The device as claimed in claim 1, wherein said identification code transmission unit further comprises a first transmit-receive control timer for transmitting the identification code signal and receiving the confirmation code signal as intermittent signals and said use prohibition canceling unit further comprises a second transmit-receive control timer for transmitting the confirmation code signal and receiving the identification code signal as intermittent signals.

9. The device as claimed in claim 1, wherein the identification code signal and the confirmation signal comprise the same signal.

10. The device as claimed in claim 1, wherein said use prohibition canceling unit transmits a use prohibition canceling signal to the electronic device to maintain the electronic device in the operational state while the identification code signal received by said second receiver is at or above the predetermined value, and when the identification code signal is below the predetermined value, said use prohibition canceling unit stops transmitting the use prohibition canceling signal to the electronic device to at least partially disable the electronic device.

* * * * *